(12) United States Patent
Walls et al.

(10) Patent No.: US 7,673,060 B2
(45) Date of Patent: Mar. 2, 2010

(54) SYSTEMS AND METHODS FOR PROVIDING RELIABLE MULTICAST MESSAGING IN A MULTI-NODE GRAPHICS SYSTEM

(75) Inventors: Jeffrey Joel Walls, Fort Collins, CO (US); Donley Byron Hoffman, Fort Collins, CO (US); Byron Alan Alcorn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1431 days.

(21) Appl. No.: 11/048,244

(22) Filed: Feb. 1, 2005

(65) Prior Publication Data
US 2006/0174020 A1    Aug. 3, 2006

(51) Int. Cl.
*G06F 15/16* (2006.01)
(52) U.S. Cl. .................................................. 709/230
(58) Field of Classification Search ................ 709/230, 709/238, 239
See application file for complete search history.

(56) References Cited

U.S. PATENT DOCUMENTS

| | | | |
|---|---|---|---|
| 5,036,518 A | | 7/1991 | Tseung |
| 5,109,384 A | | 4/1992 | Tseung |
| 5,517,622 A | * | 5/1996 | Ivanoff et al. ............... 709/232 |
| 5,742,778 A | | 4/1998 | Hao et al. |
| 5,905,871 A | * | 5/1999 | Buskens et al. ............. 709/245 |
| 5,918,020 A | * | 6/1999 | Blackard et al. ............ 709/228 |
| 6,115,357 A | * | 9/2000 | Packer et al. ................ 370/231 |
| 6,247,059 B1 | * | 6/2001 | Johnson et al. ............. 709/237 |
| 6,393,581 B1 | * | 5/2002 | Friedman et al. ................ 714/4 |
| 6,459,429 B1 | * | 10/2002 | Deering ....................... 345/423 |
| 6,473,425 B1 | * | 10/2002 | Bellaton et al. ............. 370/392 |
| 6,577,599 B1 | * | 6/2003 | Gupta et al. ................. 370/236 |
| 6,985,454 B1 | * | 1/2006 | Wiedeman et al. .......... 370/316 |
| 2003/0028657 A1 | | 2/2003 | Thunquest et al. |
| 2003/0043803 A1 | | 3/2003 | Hooper |
| 2003/0147390 A1 | | 8/2003 | Rizzo et al. |
| 2003/0158992 A1 | | 8/2003 | Ajanovic et al. |

(Continued)

OTHER PUBLICATIONS

Bo Rong et al. SDL Modeled Hybrid Error Control Scheme For Reliable Multicast Over Internet. May 2004. CCECE/IEEE. pp. 1-6 (0409-0414).*

(Continued)

*Primary Examiner*—John Follansbee
*Assistant Examiner*—Imad Hussain

(57) ABSTRACT

Embodiments of the present invention are broadly directed to novel systems and methods for providing reliable multicast of data in a multi-node graphics system. In accordance with one embodiment of the invention, a multi-node computer graphics system is provided comprising a master node capable of executing a graphics application and a plurality of render nodes configured to collectively render a graphic image, in response to graphics data communicated from the master node. The embodiment further comprises logic associated with the master node for communicating graphics data to the plurality of render nodes in a multicast packet. Additional logic, associated with the master node, is provided for determining whether a predetermined number of render nodes have acknowledged receipt of the multicast packet. The embodiment further comprises logic associated with the master node for re-transmitting the multicast packet to the plurality of render nodes, if the predetermined number of render nodes have not acknowledged receipt of the multicast packet within a given time.

22 Claims, 5 Drawing Sheets

U.S. PATENT DOCUMENTS

| | | | |
|---|---|---|---|
| 2003/0195964 A1 | 10/2003 | Mane | |
| 2004/0003127 A1 | 1/2004 | Hensbergen et al. | |
| 2004/0015536 A1 | 1/2004 | Cohen et al. | |
| 2004/0090959 A1 | 5/2004 | Cinghita et al. | |
| 2004/0148387 A1* | 7/2004 | Sethi | 709/224 |
| 2004/0169657 A1* | 9/2004 | Morgan et al. | 345/501 |
| 2005/0017968 A1* | 1/2005 | Wurmlin et al. | 345/419 |
| 2005/0166214 A1* | 7/2005 | Kaulgud et al. | 719/321 |
| 2005/0188107 A1* | 8/2005 | Piercey et al. | 709/238 |
| 2005/0220064 A1* | 10/2005 | Hundscheidt et al. | 370/342 |
| 2006/0023634 A1* | 2/2006 | Morandin | 370/252 |
| 2006/0092162 A1* | 5/2006 | Deering et al. | 345/506 |

OTHER PUBLICATIONS

Prasanna Chaporkar et al. A Dynamic Threshold Selection Policy for Retransmission in MAC Layer Multicast. Oct. 2003. 41 Annual Allerton Conference on Communication, Control, and Computing. pp. 1-2 (312-313).*

Jean-Chrysostome Bolot et al. Scalable Feedback Control for Multicast Video Distribution in the Internet. 1994. SIGICOMM 94/ACM. pp. 1-10 (58-67).*

S. Armstrong et al. RFC 1301: Multicast Transport Protocol. Feb. 1992. Network Working Group. pp. 1-38.*

Paul, Sanjoy et al. Reliable Multicast Transport Protocol (RMTP). IEEE Journal on Selected Areas in Communications, vol. 15, No. 3, Apr. 1997. pp. 1-15 (407-421).*

Paper entitled "X-Windows" by Richard Wilkinson, Tessella Support Services PLC, Issue V1.R3.M0, dated Feb. 2003, 10 pages.

Presentation entitled "sv7: Blazing Visualization on a Commodity Cluster" by Byron Alcorn, hp invent, Jul. 2003, 23 pages.

* cited by examiner

SYSTEMS AND METHODS FOR PROVIDING RELIABLE MULTICAST MESSAGING IN A MULTI-NODE GRAPHICS SYSTEM

BACKGROUND OF THE INVENTION

In one-to-many data communication, the same information is to be sent to many different data processing stations. This situation is commonly known as "broadcast" or "multicast". Broadcasted messages are typically directed to all network nodes, while multicasted messages are directed to a subset of nodes on the communications network the message is intended for. A number of networks (e.g., token ring, Ethernet, radio, microwave and satellite networks) possess broadcast or multicast capabilities. However, the multicasted or broadcasted message can still be missed or incorrectly received by one or more network nodes (e.g., the message may be distorted due to electrical interference, loose connections, faulty hardware, slow or busy receiving data processing stations, or other reasons).

Multicast transmissions are becoming increasingly common. In contrast to standard Internet Protocol (IP) point to point transmissions (unicast), IP multicast enables the simultaneous transmission of information to a group of recipients from a single source. In this approach, a multicast server transmits data over one or more multicast channels which one or more client receivers join or subscribe to. In this model, the server only sends out one copy of the data irrespective of the number of client recipients listening to the appropriate multicast channel or channels. In IP multicast, the server does not even need to know who the recipients are or the number of recipients in a particular multicast group.

IP multicast enables real-time communications over wide area IP networks and typical transmissions include video and audio conferencing, live multimedia training, university lectures, and transmission of live television and radio programmes, for example. IP multicast also enables more persistent data to be transmitted, including for instance, media session descriptions comprising session-oriented and user-oriented data.

A multicast media session usually consists of one or more individual media streams typically carrying video, audio, whiteboard or raw data. Some sessions are persistent, but the majority exist for a specific period of time, although need not be continuous. Multicast-based transmissions differ from unicast IP transmissions in that any user knowing about the transmission can join the session (unless the transmission is encrypted) and to receive a transmission, a user only needs to know the appropriate transmission group address and timing information for the session.

The Multicast messaging protocol is unreliable insofar as the unidirectional messaging protocol does not provide a mechanism for confirming or insuring delivery of the message packets. In this regard, the various individual data packets are communicated in the same fashion as a datagram over an IP network. For many applications, an occasional lost packet is acceptable, and a multicast messaging protocol is a viable mechanism for communicating data from a single source to a plurality of receiving nodes.

In some systems, however, reliable delivery of the data is important. Consider, for example, an audio or a video broadcast. Losing occasional packets of the data at various nodes, from time to time, results in content of the audio or video broadcast being missed. Such missed content is often undesirable. In some such systems, where reliable transmissions are desired, a layer is provided over the IP layer that ensures successful delivery and receipt of the various packets of data, by providing for acknowledgments from the receiving nodes. In such systems, a packet of data may be sent via multicast protocol to one hundred (for example) different nodes or machines. Each node may respond with an acknowledgement to the sending node to confirm receipt of the transmitted packet. If, for example, four of the one hundred nodes do not successfully acknowledge the packet, then the sending node may be configured to individually retransmit the packet to each of those four machines. Once receipt of the transmitted packet is confirmed by all machines that are a part of the session (or group of receiving nodes), the transmitting node may proceed to the transmission of the next packet of data.

Such an approach sacrifices throughput in favor of the integrity that all data transmitted is received at all nodes. Such a solution is acceptable in systems where real time participation is not required. For example, in an application in which users are viewing or listening to a video or audio broadcast, it is often irrelevant if the viewing takes place with a time lag (e.g., twenty seconds after the broadcast). In such systems, each of the receiving nodes may have an appropriate buffer for buffering the data received from the sending node, whereby enough data is buffered so that the replay of the audio or video broadcast appears continuous to the user, albeit in a relatively significant time delay from the time it was broadcast from the transmitting computer.

In other applications, such a solution is not acceptable. Consider, for example, high-end systems that are configured for rendering three-dimensional computer graphics. Such systems involve computationally-intensive processes, whereby three-dimensional computer graphics are rendered by using a pool or group of computers, which share the processing responsibilities. In such a system, one computer may be configured to execute at least one application program and communicate graphics data to other computers for processing and rendering. In this regard, a collection of computers may be configured to cooperatively render a graphics image and may receive the data to be rendered from the computer executing the application program. The rendered image, then, may be displayed on a single display for viewing by a user who is interacting with the application program. In such a system, it is important that: (1) all graphics data transmitted by the computer executing the application program be successfully received at each of the various render nodes; and (2) that the communication occur in substantially real-time, so that there is no appreciable delay between the interactions between the user and the application program as the resulting display is presented to the user. Clearly, such systems involve competing interests, in view of the forgoing discussion.

In this regard, if all data is not successfully received by the various render nodes, then portions of the graphics image may either be missing from the display, or the display of the graphics image may appear choppy, or the image may appear degraded. Likewise, if the visual display is displayed to a user with an appreciable time lag, then interaction between the user and the application is frustrated.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
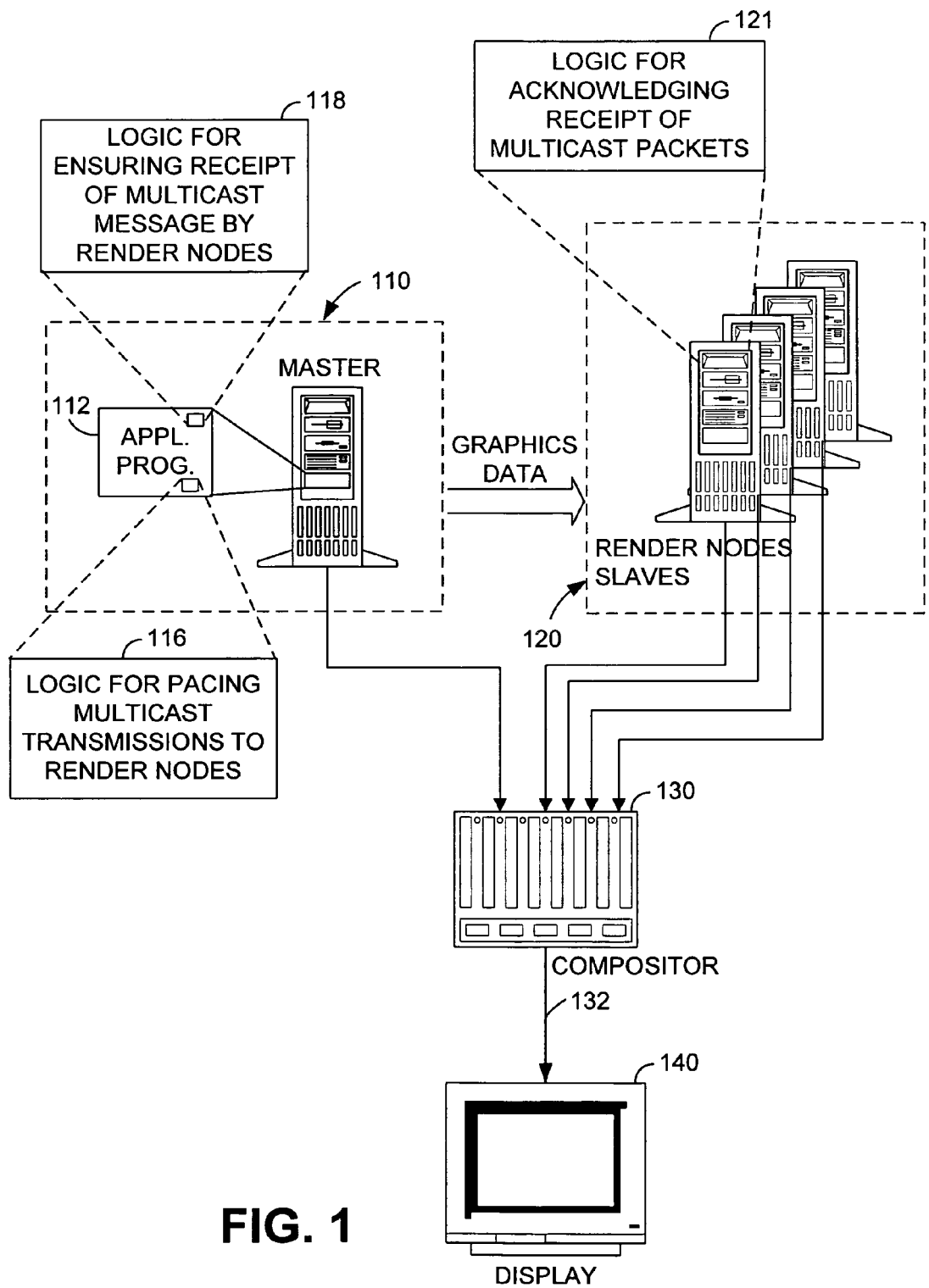
FIG. 1 is a block diagram illustrating a computer graphics system having multiple render nodes configured in accordance with one embodiment of the present invention.

Reference is now made to the drawings, in which FIG. 1 illustrates a computing environment in which one embodiment of the present invention resides and operates. As previously described, many high-end or intensive graphics programs are executed and graphics images are rendered using a plurality of computers (or nodes) in combination. There are various ways in which multiple computers may be configured to operate either in parallel or in conjunction to perform a graphics-rendering task. One way is to configure one computer 110 to operate as a master, and configure the remaining plurality of computers 120 to operate as slaves. In the illustrated embodiment, the slave computers 120 are configured to collectively render a three-dimensional graphics image. The rendering among the slave computers 120 may be partitioned in a variety of ways. One way is to divide the screen space into various partitions and have each slave computer render the data associated with its partition. Another way is to partition the graphics data into layers and have each slave 120 render one or more layers.

In the embodiment illustrated in FIG. 1, the master computer 110 executes an application program 112 that involves the rendering of three-dimensional graphics. The control and functionality of the application program 112 are handled by the master computer 110. As well, the master computer 110 handles various two-dimensional graphics rendering that is incidental to the execution of the application program 112. For example, the presentation of drop-down menus or other items of presentation that do not require three-dimensional rendering is performed by the master computer 110. Each of the computers (master computer 110 and each of the slave computers 120) comprises a graphics card that outputs a signal for driving a video display 140. Since, however, the content that is rendered by each of the computers must first be combined, the video outputs of each of the computers are delivered to a compositor 130. A compositor 130 operates to combine the content of each of the plurality of input video signals to deliver a single, composite output signal 132 that is used to drive a display device 140.

Consistent with the scope and spirit of the embodiments of the invention described herein, an alternative environment (not shown) comprises multiple displays 140 that are configured to operate as a single logical display. There are a variety of applications in which graphics information is presented over a panel or matrix of displays, to effectively emulate a single, large display. Examples of such systems include: real estate, financial (such as the stock market), control room, large engineering processes, military mapping, telecommunications, etc. Such systems require the output of large amounts of data, which can easily exceed the viewable display capacity of a single, physical monitor (a user could view relevant data only by panning and zooming).

In a system environment such as that of FIG. 1, the computer 110 executing the graphics application program communicates to the cluster of render nodes 120 the relevant data used for carrying out the rendering operations. The structure and content of such data will be known and appreciated by persons skilled in the art, as it is the underlying data specifying primitives, texture, lighting, shading, and other aspects employed for rendering a given graphics image. In one embodiment, such information is communicated by the master 110 to the individual slave computers as appropriate, based upon the partitioned operation of the slave units. In other embodiments, the data is communicated to a defined slave computer that is running a process or program that would further subdivide and allocate the underlying graphics information to individual slave nodes for processing.

As is further illustrated in FIG. 1, logic 116 is provided in connection with the master node 110 for pacing multicast transmissions to the various render nodes. There are a variety of mechanisms that may be utilized, consistent with the scope and spirit of the present invention, for implementing this logic. One approach is simply to utilize a timer (or other timing mechanism) to limit the frequency of multicast transmissions, such that only one multicast transmission occurs in a given time period. Such an approach minimizes buffer overruns that may occur at the render nodes, due to excessive transmissions within a given time period. The particular value or amount of time that may be utilized for such an embodiment will vary from system to system, depending upon factors such as capabilities of the computers, the amount of data transmitted in each packet, the application being executed at the master, etc. In this regard, it is recognized that one reason data packets are often not successfully received is a result of input buffers at the receiving nodes being overrun with data. As received buffers get filled, newly arriving data is rejected and therefor not successfully received. By pacing the transmissions from the master nodes 110, likelihood of receipt of the messages by the various render nodes is improved.

In addition to the logic 116 for pacing the multicast transmissions, logic 118 is also provided for facilitating the receipt, by each of the render nodes, or multicast packet that is transmitted by the master node 110. In one embodiment, this logic 118 more specifically comprises logic (not specifically shown) for receiving acknowledgement signals (transmitted from logic 121) from each of the plurality of render nodes, as well as logic for re-transmitting the multicast message where appropriate. In this regard, certain embodiments of the present invention provide for a retransmission of a multicast packet if the packet is not received by each and every one of the render nodes. In other embodiments, a retransmit is configured to be performed only if a predetermined number of the plurality of render nodes do not acknowledge successful receipt of the multicast packet. Further, embodiments of the invention utilize a multicast protocol for the retransmitted packet (as opposed to performing the retransmit with a one-to-one communication protocol (like a unicast message or TCP/IP—Transmission Control Protocol/Internet Protocol—communication). In this regard, a multicast retransmission is a retransmission of a packet to all nodes in the plurality of nodes that received the original multicast transmission (both nodes that received and acknowledged the original transmissions and nodes that did not).

By providing such improved packet delivery and/or by pacing the transmissions, a more robust, reliable, and better performing system is realized.

Figure 2:
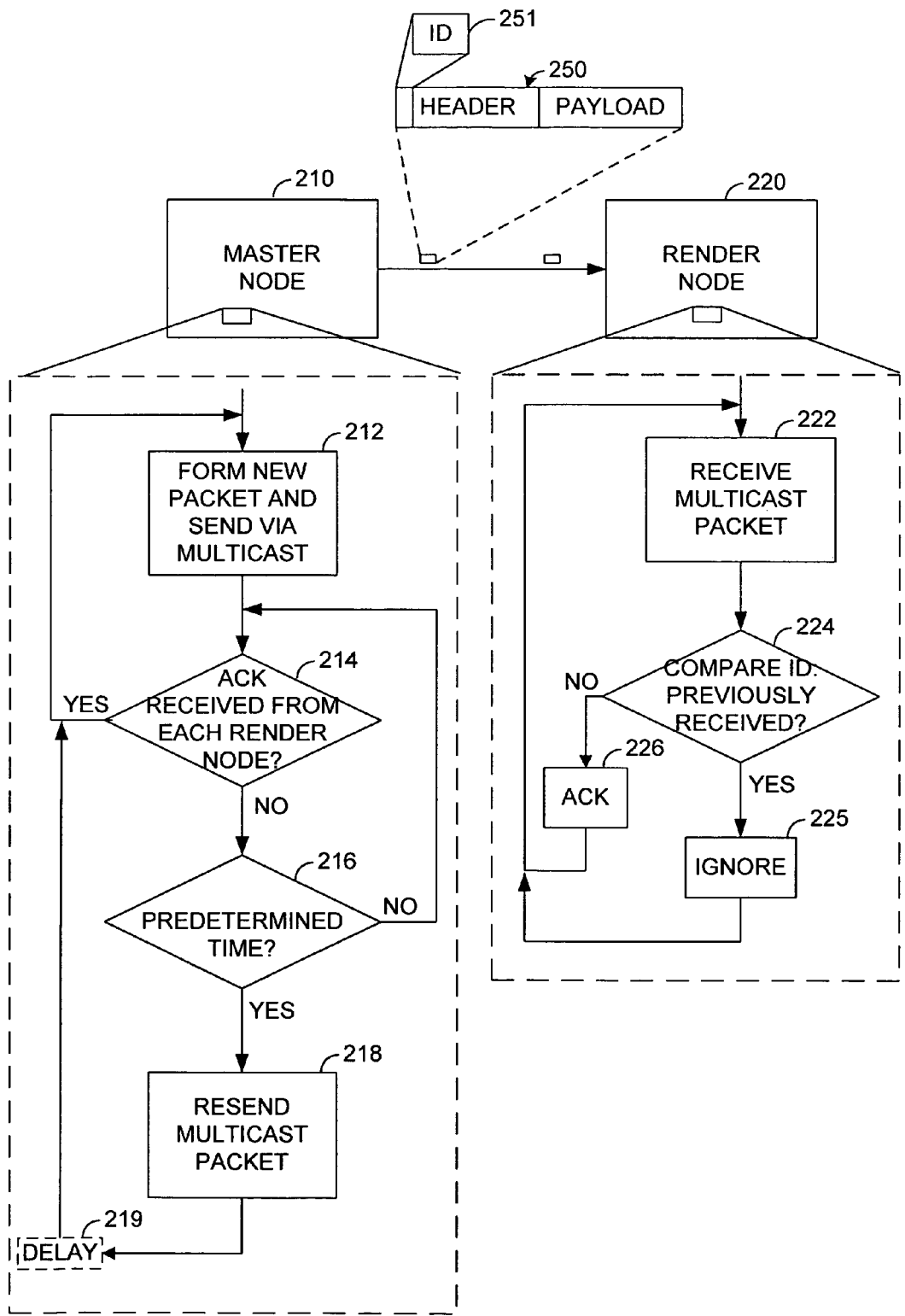
FIG. 2 is a diagram illustrating a master node and one of a plurality of render nodes, including a flow diagram illustrating certain operational features, in a graphics system constructed in accordance with an embodiment of the invention.

Reference is now made to FIG. 2, which is a diagram illustrating certain features and components of one embodiment of the present invention. In FIG. 2, a master node 210 and a single render node 220 (of a plurality of a similarly-configured render nodes) are illustrated. Within the master node 210, logic 212 is provided for forming a new data packet of information and sending that data packet via a multicast protocol to all of the render nodes. In some embodiments, the transmission of a newly-formed data packet occurs substantially immediately after its formation (e.g., as soon as the formation or composure of the new packet is completed). In other embodiments, an additional delay (i.e., a delay after the formation of the packet is completed) is provided before transmission of the newly-formed packet. Logic 214 and 216 is also provided to determine whether an acknowledgement is received from each of the plurality of render nodes within a predetermined period of time. As illustrated by logic 214, once an acknowledgement is received from each of the render nodes, the embodiment returns to the logic of 212 to immediately form a new (subsequent) packet and send that new packet via multicast protocol to all of the render nodes. As illustrated by logic 216, the system will wait for up to a predetermined period of time to receive an acknowledgement from all of the render nodes. At that time, if an acknowledgement has not been received from all render nodes, then the system comprises logic 218 to perform a retransmission of the same multicast packet. Unlike the original multicast packet, however, with regard to the retransmitted multicast packet, the system does not monitor acknowledgements to ensure delivery of the retransmitted packet. In this regard, it is assumed that the retransmitted packet will be received by those nodes that did not receive the original packet.

In this regard, as illustrated by reference numeral 250, a multicast packet comprises a header portion and a payload portion. Among other information included in the header portion, the header has an identification 251 of the particular packet being sent. Therefore, the retransmission of the multicast packet again goes to all render nodes. Correspondingly, each render node comprises logic 222 for receiving communicated packets, as well as logic 224 for determining (based upon the packet id) whether that packet was previously received. If the packet was previously received (that is, it was received in connection with the original multicast), then the render node 220 simply ignores the second or ensuing packet (225). If, however, the render node determines (224) that the packet was not previously received, then it generates an acknowledgement (226) to communicate back to the master node. In accordance with the operation of the embodiment of FIG. 2, if this acknowledgement is generated in response to the retransmitted multicast packet, the acknowledgement is simply ignored by the master node 210 (as the master does not look for acknowledgements from the retransmitted packets), thereby simplifying the implementation of this embodiment of the render nodes.

In an alternative embodiment, the master node may be configured to send additional retransmissions before forming a successive packet. That is, if after a first retransmission all (or a predetermined number of) render nodes have not acknowledged receipt of the retransmitted packet then the master node may retransmit the same packet yet again.

After the master node has performed a resend or retransmission (218) of a multicast message, it may immediately form a new multicast packet (containing new graphics data) and send it via an ensuing multicast message. Alternatively, in another embodiment, the master node 210 may build in a delay 219 to provide a predefined delay between a retransmitted packet and a newly formed and sent, ensuing packet of data. This delay block or step 219 is illustrated in dashed line, as it is a feature that is optional to the embodiment of FIG. 2. In some implementations, such a delay may be desired so that the ensuing packet of data will less frequently result in buffer overruns at the receiving or render nodes. In other implementations, it may be assumed that the number of render nodes that did not properly receive the previous packet is relatively small so that most render nodes are set and ready to receive the ensuing packet, such that the ensuing packet could be sent without delay. In yet other embodiments, after the master computer has performed the retransmission of a multicast message, it waits a predetermined time for all slave nodes to acknowledge the retransmitted message. If acknowledgements are not received from all slave nodes, then another retransmit is performed via multicast. This cycle is repeated until acknowledgments from all render nodes are received. Of course, the particular embodiment implemented may depend upon the application that is running on the master, and its tolerance (or the user's tolerance) for small errors.

Figure 3:
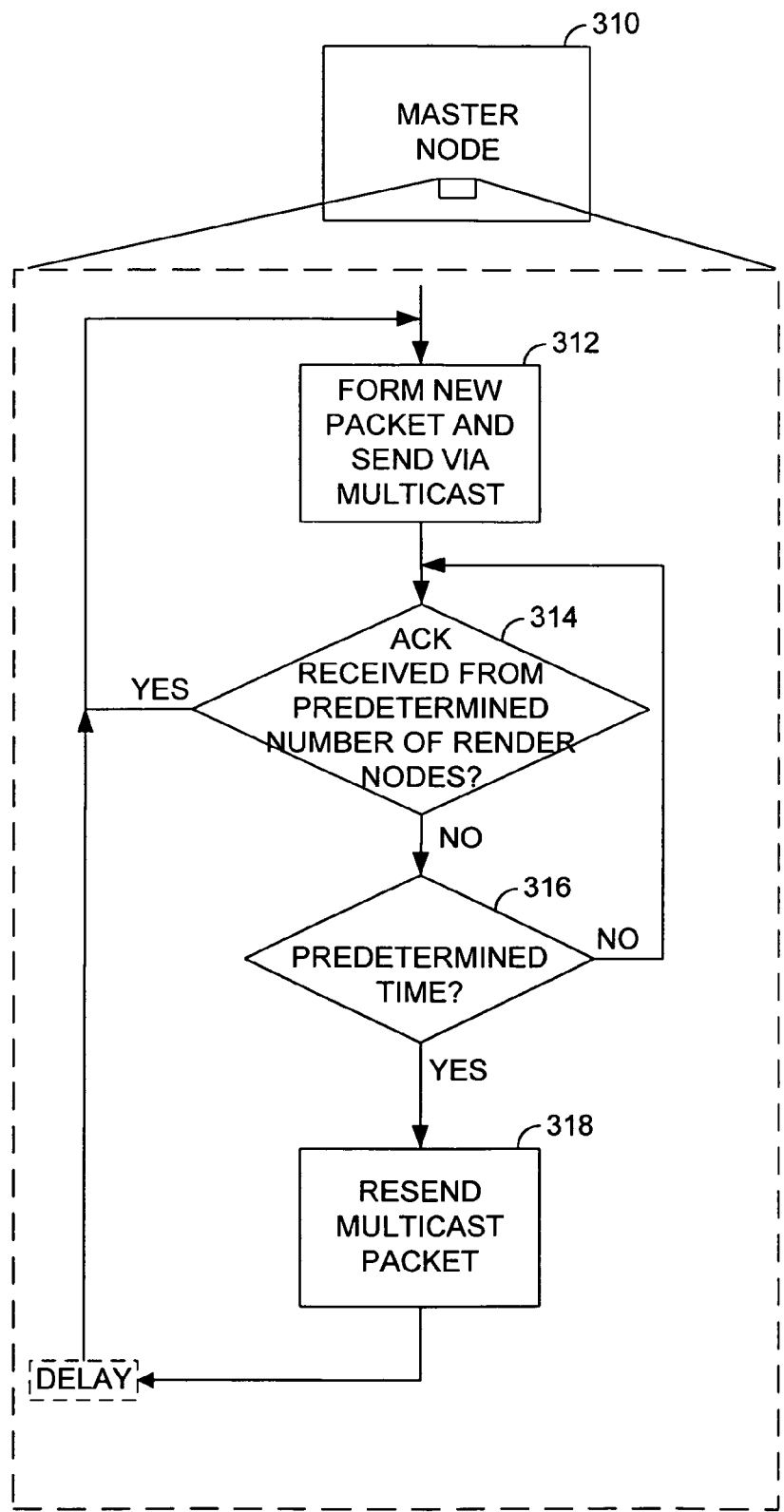
FIG. 3 is a diagram, including a flow diagram illustrating certain operational features at a master node, of one embodiment of the invention.

Reference is now made to FIG. 3, which is a diagram illustrating components within a master node of an alternative embodiment of the present invention. As in the embodiment of FIG. 2, the master node 310 comprises logic 312 for forming a new data packet and sending it to the plurality of render nodes via a multicast protocol. Logic 314 and 316 are also provided within the master node 310 to operate similarly to logic 214 and 216 of FIG. 2. A difference, however, from the embodiment of FIG. 2 is that logic 314 in the embodiment of FIG. 3 is configured to require the receipt of acknowledgements from only a predetermined number of render nodes, as opposed to all render nodes. Such an embodiment or implementation may be desired based upon the application program or the mode of operation of the application program. For example, if the application is operating in a mode such that the graphics being displayed are being displayed to a user in a draft or preview mode, then occasional irregularities presented to the user on the screen, resulting from occasional missed packets of data, may be deemed to be acceptable, such that requiring one hundred percent acknowledgement from all render nodes is not necessary. In this regard, the embodiment of FIG. 3 may sacrifice render quality in exchange for faster throughput.

Figure 4:
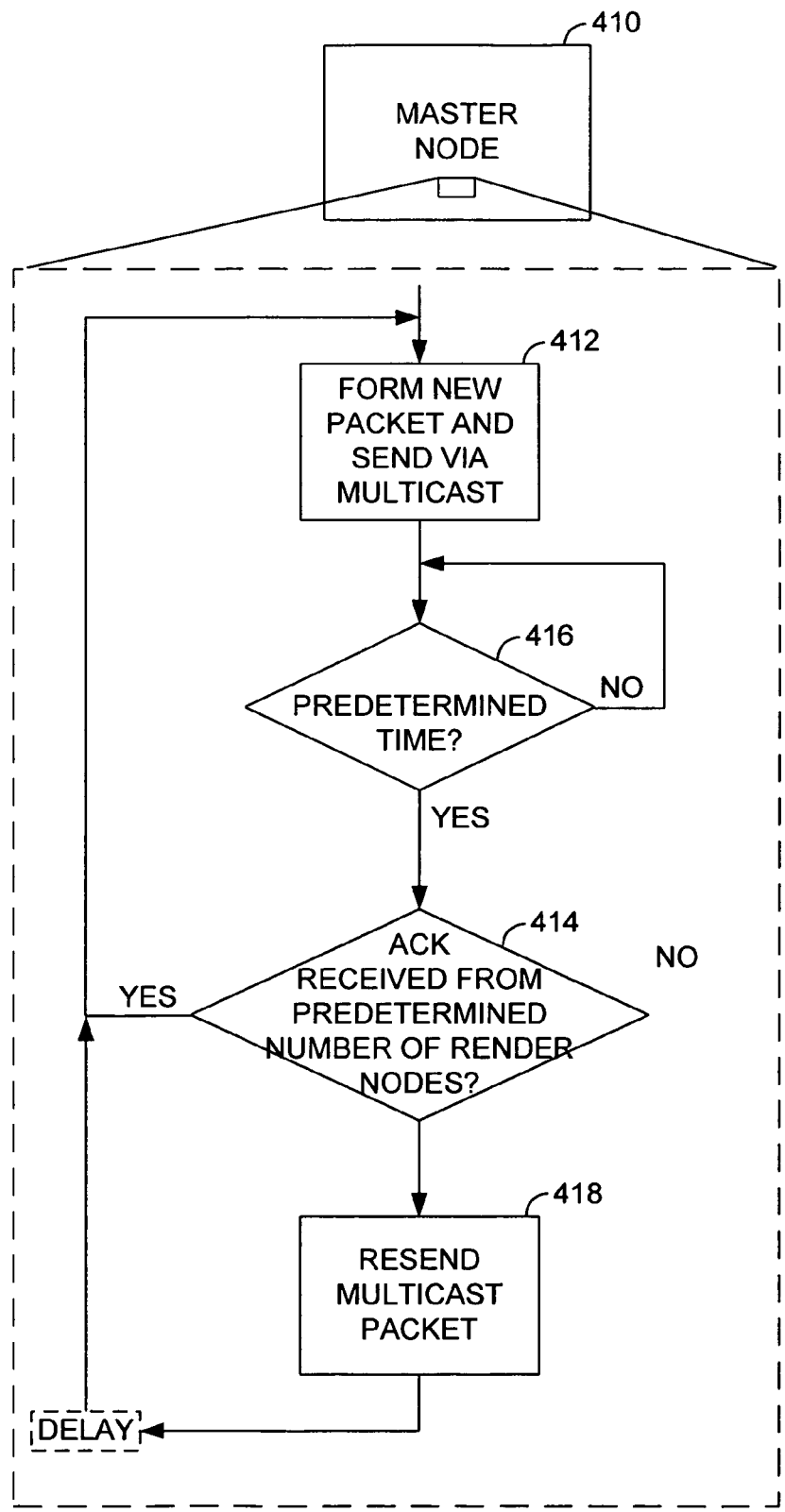
FIG. 4 is a diagram, including a flow diagram illustrating certain operational features at a master node, of another embodiment of the invention.

Reference is now made to FIG. 4, which is a diagram similar to FIG. 3, illustrating yet another embodiment of the invention. In the embodiment of FIGS. 2 and 3, upon receipt of all (or a predetermined number of) acknowledgements, the systems are configured to immediately form and transmit an ensuing multicast packet. In the embodiment of FIG. 4, the system mandates a predetermined pacing of the transmission of the various multicast messages. In this regard, logic 416 ensures that a predetermined amount of time has passed, regardless of whether acknowledgements have or have not been received from the various render nodes. Only after this predetermined time has passed, does logic 414 evaluate whether acknowledgments have been received from a predetermined number of render nodes. If so, then the system proceeds to the formation and transmission of the next ensuing data packet. In certain embodiments, the predetermined number of nodes is all of the render nodes.

Figure 5:
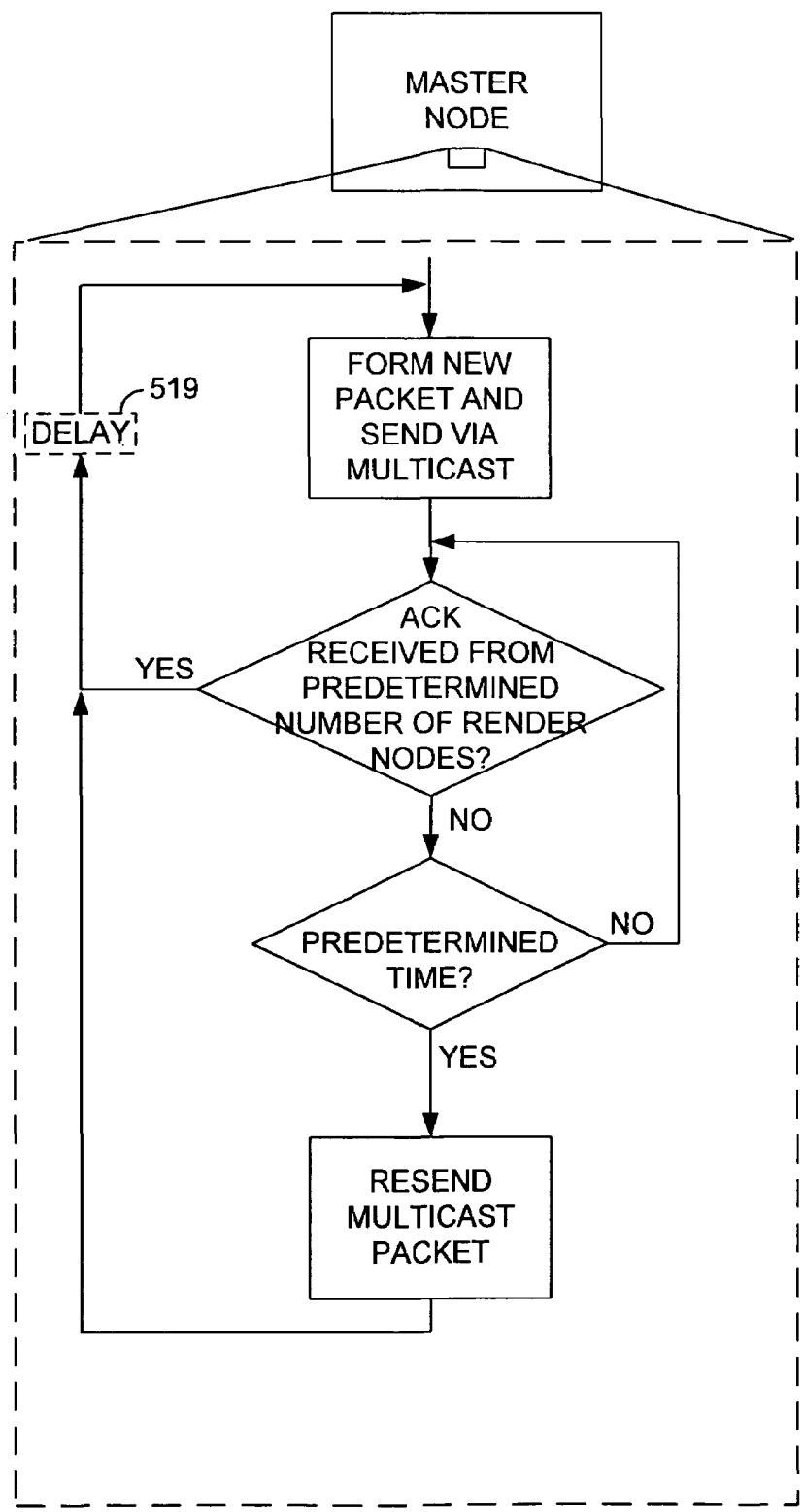
FIG. 5 is a diagram illustrating an alternative implementation to an embodiment of the invention.

Reference is made briefly to FIG. 5, which illustrates yet another embodiment. The embodiment of FIG. 5 illustrates a different implementation. In fact, the illustrated implementation is the same as that of FIG. 3, except that the delay 519 is configured to ensure a minimum prescribed delay after both the original multicast packet transmission and re-transmission (if required).

FIGS. 2, 3, 4, and 5 have illustrated certain logic components in the form of operational or flow diagrams. It should be appreciated that the flow diagrams have been illustrated in the manner that they have been simply for purposes of illustration and understanding of the functional operation of the embodiments. There are a variety of forms or embodiments in which the logic may be implemented for carrying out the functionality illustrated. For example, FIG. 4 illustrated essentially the reversal of functionality 414 and 416 from functionality 314 and 316 of FIG. 3. As confirmed by the illustration in FIG. 5, these operational blocks need not be reversed in order to build in the delay that is illustrated in the embodiment of FIG. 4. Again, the flow diagrams have been presented in the manner that they are presented herein simply to facilitate a better understanding of the operational aspects of the embodiments and should not be construed as physical or logical limitations on the implementation of various system embodiments of the present invention.

In yet another embodiment, a computer-readable medium comprising program code is provided for execution by a master node. The computer-readable medium comprises logic for providing reliable multicast of data in a multi-node graphics system. In accordance with one embodiment of the invention, a multi-node computer graphics system is provided comprising a master node capable of executing a graphics application and a plurality of render nodes configured to collectively render a graphic image, in response to graphics data communicated from the master node. The computer-readable medium further comprises logic associated with the master node for communicating graphics data to the plurality of render nodes in a multicast packet. Additional logic, associated with the master node, is provided for determining whether a predetermined number of render nodes have acknowledged receipt of the multicast packet. The embodiment further comprises logic associated with the master node for re-transmitting the multicast packet to the plurality of render nodes, if the predetermined number of render nodes have not acknowledged receipt of the multicast packet within a given time.

The program code, which comprises an ordered listing of executable instructions for implementing logical functions, can be embodied in any computer-readable medium for use by or in connection with an instruction execution system, apparatus, or device, such as a computer-based system, node-containing system, or other system that can fetch the instructions from the instruction execution system, apparatus, or device and execute the instructions. In one embodiment, the computer-readable medium comprises logic for modifying a render operation in response to a change in at least one parameter.

In the context of this document, a "computer-readable medium" can be any means that can contain, store or communicate the program for use by or in connection with the instruction execution system, apparatus, or device. The computer-readable medium can be, for example but not limited to, an electronic, magnetic, optical, electromagnetic, infrared, or semiconductor system, apparatus, device, or medium. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), a portable compact disc read-only memory (CDROM) (optical), and other types of computer-readable medium now known or later developed. In addition, the scope of the certain embodiments of the present invention includes embodying the functionality of the preferred embodiments of the present invention in logic embodied in hardware or software-configured mediums.

What is claimed is:

1. A multi-node computer graphics system comprising:
    a master node capable of executing a graphics application;
    a plurality of render nodes configured to collectively render a graphics image, in response to graphics data communicated from the master node;
    logic associated with the master node that, when implemented by the master node, communicates graphics data to the plurality of render nodes in a packet by multicast;
    logic associated with the master node that, when implemented by the master node, determines whether a predetermined number of render nodes have acknowledged receipt of the packet communicated by multicast, where the predetermined number is a plurality less than the number of all render nodes that comprise the plurality of render nodes; and
    logic associated with the master node that, when implemented by the master node, retransmits the multicast packet by multicast to the plurality of render nodes, if the predetermined number of render nodes have not acknowledged receipt of the packet communicated by multicast within a given time, and not retransmitting the packet otherwise.

2. The system of claim 1, wherein the predetermined number of render nodes comprises substantially all render nodes that comprise the plurality of render nodes.

3. The system of claim 1, further comprising logic that, when implemented by the master node, forms a new, successive packet for multicast and transmits the new packet by multicast responsive to receiving acknowledgments from the predetermined number of render nodes.

4. The system of claim 1, further comprising logic that when implemented by the master node, forms a new, successive packet for multicast and transmits the new packet by multicast responsive to receiving acknowledgments from the predetermined number of render nodes, and after waiting for the given time.

5. The system of claim 1, further comprising evaluation logic associated with a render node that, when implemented by the render node, evaluates an identification of received packets that were communicated by multicast to determine whether a packet having the same identification has been previously received by multicast.

6. The system of claim 1, further comprising acknowledgement logic associated with a render node that, when implemented by the render node, transmits an acknowledgement to the master node upon receipt of a packet communicated by multicast.

7. The system of claim 5, further comprising acknowledgement logic associated with a render node that, when implemented by the render node, transmits, responsive to the evaluation logic, an acknowledgement to the master node upon receipt of a packet communicated by multicast, only if a packet having the same identification has not been previously received by the render node.

8. A computer graphics system comprising:
    a plurality of render nodes for collectively rendering a graphics image;
    a master node for communicating graphics information to the plurality of render nodes using a multicast transmission;
    logic that, when implemented by the computer graphics system, provides a deliberate pacing to successive multicast transmissions of multicast packets between the master node and the plurality of render nodes, where the successive multicast transmissions include an initial multicast transmission of a multicast packet and a successive multicast retransmission of the multicast packet if a predetermined number of the plurality of render nodes do not acknowledge receipt of the multicast packet within a predefined time after the initial multicast transmission, where the predetermined number is a plurality; and logic that, when implemented by the computer graphics system, facilitates receipt of the multicast transmission by the plurality of render nodes.

9. The system of claim 8, wherein the logic that provides a deliberate pacing comprises delay logic configured to ensure a delay of a given period of time between each successive multicast packet transmitted from the master node.

10. The system of claim 9, wherein the delay logic comprises a timer.

11. The system of claim 8, wherein the logic that facilitates receipt of the multicast transmission comprises logic associated with each of the render nodes that, when implemented by one of the render nodes, transmits an acknowledgement to the master node upon receipt of each unique multicast packet.

12. The system of claim 8, further comprising evaluation logic associated with each of the render nodes that, when implemented by one of the render nodes, evaluates a packet identifier for determining whether a current multicast packet has previously been received by the render node.

13. The system of claim 8, wherein the logic that facilitates receipt of the multicast transmission comprises logic associated with the master node that, when implemented by the master node, ensures that a packet acknowledgment has been received for a transmitted multicast packet from at least one of the plurality of render nodes within a given period of time.

14. A method for communicating graphics data to a plurality of render nodes comprising:

configuring the plurality of render nodes to collectively render a graphics image; preparing a first packet of graphics data to be sent to the plurality of render nodes;

sending the first packet of graphics data to the plurality of render nodes using a multicast protocol;

receiving acknowledgments from at least one of the plurality of render nodes;

responsive to receiving acknowledgements from a predetermined number of the plurality of render nodes within a predetermined time, preparing a new second packet of graphic data to send to the plurality of nodes without resending the first packet of graphics data, where the predetermined number is a plurality less than the number of all render nodes that comprise the plurality of render nodes; and responsive to not receiving acknowledgements from the predetermined number of the plurality of render nodes within the predetermined time, resending the first packet of graphics data to the plurality of render nodes using a multicast mode.

15. The method of claim 14, further comprising, responsive to resending the first packet of graphics data, preparing the second packet of graphics data to send to the plurality of render nodes.

16. The method of claim 15, wherein preparing the new second packet of graphic data occurs after waiting the predetermined time.

17. The method of claim 14, further comprising waiting up to the predetermined time to receive an acknowledgement from each of the plurality of render nodes.

18. The method of claim 14, further comprising waiting for the predetermined time to receive an acknowledgement from each of the plurality of render nodes.

19. The method of claim 14, wherein preparing a new second packet of graphic data occurs after receiving the last acknowledgment from the predetermined number of the plurality of render nodes.

20. The method of claim 14, wherein preparing a new second packet of graphic data occurs after waiting the predetermined time.

21. A computer-readable storage medium for a computer graphics system comprising a plurality of render nodes for collectively rendering a graphics image and a master node for communicating graphics information to the plurality of render nodes using a multicast transmission, the computer-readable storage medium comprising:

program code for providing a deliberate pacing to successive multicast transmissions of multicast packets between the master node and the plurality of render nodes, where the successive multicast transmissions include an initial multicast transmission of a multicast packet and a successive multicast retransmission of the multicast packet if a predetermined number of the plurality of render nodes do not acknowledge receipt of the multicast packet within a predefined time after the initial multicast transmission, where the predetermined number is a plurality; and program code for facilitating receipt of the multicast transmission by each of the plurality of render nodes.

22. The computer-readable storage medium of claim 21, wherein the program code for facilitating receipt of the multicast transmission comprises program code associated with the master node for ensuring that a packet acknowledgment has been received for a transmitted multicast packet from at least one of the plurality of the render nodes within a given period of time.

* * * * *

UNITED STATES PATENT AND TRADEMARK OFFICE
CERTIFICATE OF CORRECTION

PATENT NO.        : 7,673,060 B2
APPLICATION NO.   : 11/048244
DATED             : March 2, 2010
INVENTOR(S)       : Jeffrey Joel Walls et al.

It is certified that error appears in the above-identified patent and that said Letters Patent is hereby corrected as shown below:

In column 8, line 15, in Claim 1, after "the" delete "multicast".

In column 8, line 29, in Claim 4, delete "that" and insert -- that, --, therefor.

Signed and Sealed this

Twenty-second Day of June, 2010

David J. Kappos
*Director of the United States Patent and Trademark Office*